(12) United States Patent
Mancuso

(10) Patent No.: US 9,296,483 B2
(45) Date of Patent: Mar. 29, 2016

(54) DISTRIBUTED ICE PROTECTION CONTROL SYSTEM

(75) Inventor: Brandon J. Mancuso, Wetherford, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 1112 days.

(21) Appl. No.: 13/532,956

(22) Filed: Jun. 26, 2012

(65) Prior Publication Data

US 2013/0013116 A1   Jan. 10, 2013

Related U.S. Application Data

(60) Provisional application No. 61/504,583, filed on Jul. 5, 2011.

(51) Int. Cl.
*G05D 19/00*      (2006.01)
*B64D 15/22*      (2006.01)
*B64D 15/12*      (2006.01)
*B64D 15/16*      (2006.01)

(52) U.S. Cl.
CPC .............. *B64D 15/12* (2013.01); *B64D 15/166* (2013.01); *B64D 15/22* (2013.01)

(58) Field of Classification Search
CPC ....... B64D 15/12; B64D 15/166; B64D 15/22
USPC ...................................... 701/3–14
See application file for complete search history.

(56) References Cited

U.S. PATENT DOCUMENTS

| | | | |
|---|---|---|---|
| 3,887,325 A | 6/1975 | Finger et al. | |
| 4,814,931 A | 3/1989 | Kugelman et al. | |
| 5,114,100 A | 5/1992 | Rudolph et al. | |
| 5,160,102 A | 11/1992 | Hlavac | |
| 5,657,951 A | 8/1997 | Giamati | |
| 5,823,474 A | 10/1998 | Nunnally | |
| 5,898,308 A * | 4/1999 | Champion | 324/643 |
| 6,227,492 B1 | 5/2001 | Schellhase et al. | |
| 7,089,972 B2 | 8/2006 | Kneringer et al. | |
| 7,580,777 B2 | 8/2009 | Smith et al. | |

(Continued)

FOREIGN PATENT DOCUMENTS

| | | |
|---|---|---|
| CN | 1116600 A | 2/1996 |
| CN | 1588258 A | 3/2005 |

(Continued)

OTHER PUBLICATIONS

Second Office Action in related Chinese Application No. 201210233017.2, dated Aug. 20, 2014, 23 pages.

(Continued)

*Primary Examiner* — Richard Camby

(74) *Attorney, Agent, or Firm* — Noah A. Tevis

(57) ABSTRACT

The present application includes a distributed ice protection system that utilizes a distributed control system with a server/client communication protocol to prevent single point failures, reduce affected system loss when a failure occurs, improve required maintenance turn around time, and provide a tailorable, interactive, integrated, cross platform solution for a variety of aircraft ice protection requirements. The distributed ice protection system includes master servers and control modules that are compatible with a variety of aircraft platforms. The control modules interface with individual anti-ice and de-ice hardware components on the aircraft.

18 Claims, 7 Drawing Sheets

(56) References Cited

U.S. PATENT DOCUMENTS

| | | |
|---|---|---|
| 7,926,763 B2 | 4/2011 | Froman |
| 7,936,082 B2 | 5/2011 | Boudyaf et al. |
| 2006/0226292 A1 | 10/2006 | Houlihan et al. |
| 2007/0112480 A1 | 5/2007 | Smith et al. |
| 2008/0135685 A1 | 6/2008 | Soldi et al. |
| 2008/0152494 A1 | 6/2008 | Froman |
| 2008/0258010 A1 | 10/2008 | Leon et al. |
| 2009/0072091 A1 | 3/2009 | Al-Khalil |
| 2009/0193888 A1* | 8/2009 | Rayner et al. ............... 73/290 V |
| 2010/0206990 A1 | 8/2010 | Petrenko |
| 2013/0320145 A1* | 12/2013 | McGillis et al. .......... 244/134 C |

FOREIGN PATENT DOCUMENTS

| | | |
|---|---|---|
| CN | 1626408 A | 6/2005 |
| CN | 101087716 A | 12/2007 |
| CN | 101866525 A | 10/2010 |
| EP | 0600357 A1 | 6/1994 |
| WO | 03053781 A1 | 7/2003 |
| WO | 2007118263 A1 | 10/2007 |

OTHER PUBLICATIONS

Third Office Action in related Chinese Application No. 201210233017.2, dated Nov. 21, 2014, 17 pages.
First Office Action in related Chinese Application No. 201210233017.2, dated Feb. 8, 2014, 7 pages.
Canadian Notice of Allowance in related Canadian Application No. 2,782,709, dated May 23, 2014, 1 page.
Canadian Examiner Communication in related Canadian Application No. 2,782,709, dated Jul. 25, 2013, 3 pages.
European Search Report in related European Application No. 12175134.1, dated Feb. 28, 2013, 6 pages.
First Office Action in related Chinese Application No. 201210233017.2, dated Apr. 23, 2015, 22 pages.

* cited by examiner

DISTRIBUTED ICE PROTECTION CONTROL SYSTEM

BACKGROUND

1. Technical Field

The present application relates to an ice protection system for an aircraft.

2. Description of Related Art

Typically, ice protection systems for aircraft are configured with customized controllers, each controller being specifically tailored to perform a unique task. Such a system is susceptible to single point failures which can cause large portions of the ice protection system to fail. Further, a modification of the ice protection system typically requires a new customized controller when the modification affects functionality controlled by that specific controller. Moreover, prior art ice protection systems are typically specific to a certain aircraft.

Hence, there is a need for an improved ice protection system.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system of the present application are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application includes a distributed ice protection system (D-IPS) 101. Distributed ice protection system 101 utilizes a distributed control system with a server/client communication protocol to prevent single point failures, reduce affected system loss when a failure occurs, improve required maintenance turn-around time, and provide a tailorable, interactive, integrated, cross platform solution for a variety of aircraft ice protection requirements. Distributed ice protection system 101 includes master servers and control modules that are compatible with a variety of aircraft platforms.

Figure 1:
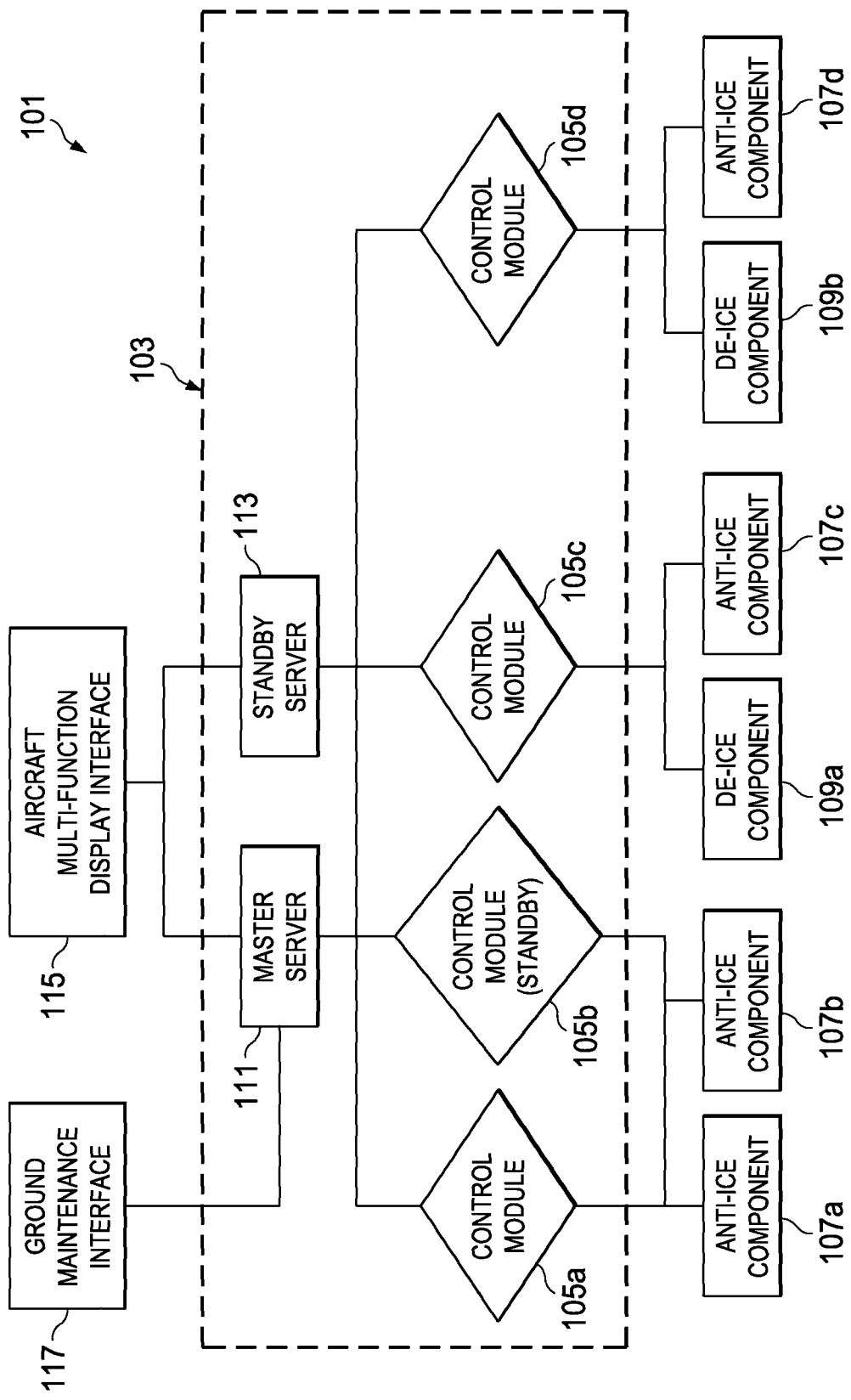
FIG. 1 is a schematic block diagram of a distributed ice protection system, according to an embodiment of the present application.

Referring to FIG. 1, distributed ice protection system 101 includes a generic control core 103. Generic control core 103 includes master server 111, standby server 113, and control modules, such as control modules 105a-105d. Control modules 105a-105d interface with individual anti-ice and de-ice hardware components, such as anti-ice components 107a-107d and de-ice components 109a and 109b. As discussed further herein, anti-ice components 107a-107d and de-ice components 109a and 109b are hardware implementations in the specific aircraft. Control modules 105a-105d are preferably located near the anti-ice or de-ice component for which it controls. It should be appreciated any plurality of master servers, standby servers, primary control modules, and standby control modules can be used in an implementation. Further, it should be appreciated that a specific implementation can employ any level of redundancy for specific servers and control modules.

Control modules 105a-105d are generic modules that are configured for the aircraft via software for the specific function needed. Each module 105a-105d can swap places and be reconfigured through the master server 111 for their new location. Control modules 105a-105d are robust and configured to withstand high thermal and vibratory loading. Further, the electronics within each control module 105a-105d are preferably sealed off from the environment.

Each control module 105a-105d can operate independently from other individual control modules 105a-105d by pulling and storing required data to/from a master server 111. Master server 111 is the server for distributed ice protection system 101, such that master server 111 provides data transfer and storage for control modules 105a-105d. A standby server 113 acts as a fully redundant backup for master server 111.

Master server 111 can also interface with an aircraft multi-function display interface (MFD) 115 and a ground maintenance interface 117. Ground maintenance interface 117 may be a computer, such as a portable laptop, for example, which enables personnel to configure each control module 105a-105d. For example, ground maintenance interface 117 may be used to load software and customize the functionality of each control module 105a-105d, via master server 111. Further, ground maintenance interface 117 provides access to master server 111 in order to retrieve fault data, provide integrated on-board troubleshooting procedures and testing, and recommended maintenance requirements via a web-browser based interface that can be accessed through laptop computer capabilities. The software contains a set of core control tools with additional functionality tailored to specific platform needs. Further, the software is configured to interface with the platform's mission computer or add-on multi-function display to provide a fully integrated ice protection system. Multi-function display 115 is an interface for an aircraft operator, such as a pilot, co-pilot, or other aircraft occupant, for example. Multi-function display 115 can allow that the aircraft operator to check the status and make commands to control modules 105a-105d.

Still referring to FIG. 1, control module 105b is configured as a redundant (standby) controller to control module 105a. In an instance of failure of control module 105a, control module 105b is configured to automatically take over control of anti-ice components 107a and 107b, as discussed further herein. As illustrated in FIG. 1, components 107a and 107b are electrically coupled to both control module 105a and 105b. It should be fully appreciated that control modules 105c and 105d can also have redundant control modules.

Server modules 111 and 113 are configured to provide data transfer and data storage for control modules 105a-105d. Server modules 111 and 113 are also configured as the interface to aircraft multi-function display interface (MFD) 115 and ground maintenance interface 117. Further, server modules 111 and 113 are the software load points and system configuration load points for all control modules 105a-105d. Control modules 105a-105d each operate independently by pulling/storing required data from/to server modules 111 and 113. Each primary control module is assigned to a region in an enclosure tailored to meet the specific needs in that region of the aircraft, the primary control module being used to control all anti-ice and de-ice zones in that region of the aircraft.

During operation, each control module 105a-105d downloads environment data, such as outside air temperature and true airspeed from server 111. Each control module 105a-105d has software downloaded from server 111 so it can monitor, control, record, and communicate back to server 111. Each control module 105a-105d is fully functional once the operational software is downloaded from the server. In other words, each control module 105a-105d is configured to operate anti-ice and de-ice components without relying on operational commands from server 111. Furthermore, control modules 105a-105d do not require functional commands from server 111. Rather, server 111 acts at least as 1) an interface with the aircraft, 2) data storage and data collection point, 3) data analysis, historical trending, and system component diagnostics, and 4) maintenance interface. Server 111 also decides what information is communicated via aircraft multi-function display interface 115. These and other functionalities of system 101 are described further herein.

Figure 2:
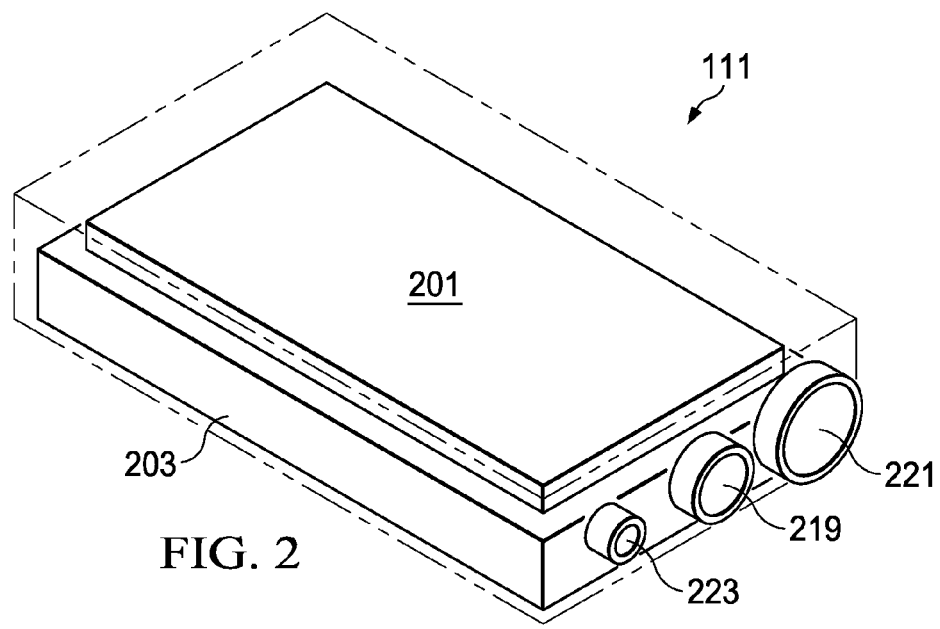
FIG. 2 is a stylized isometric view of a server module from the distributed ice protection system, according to an embodiment of the present application.
Figure 3:
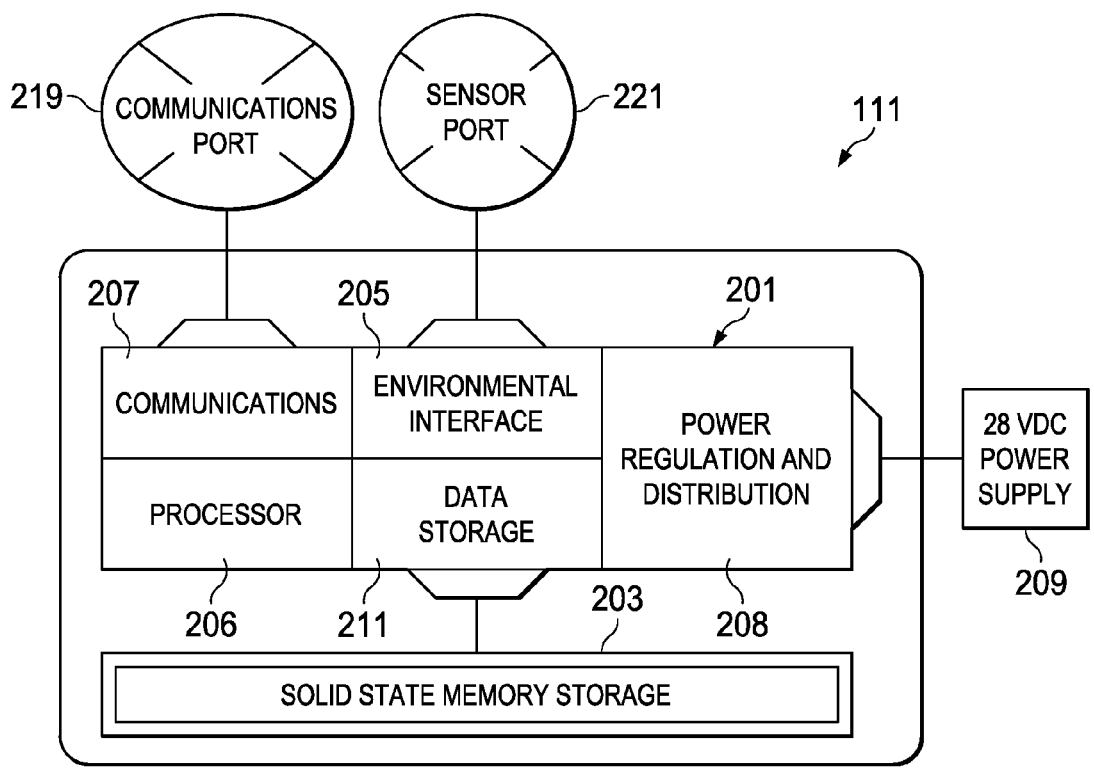
FIG. 3 is a schematic view of a server module from the distributed ice protection system, according to an embodiment of the present application.
Figure 4:
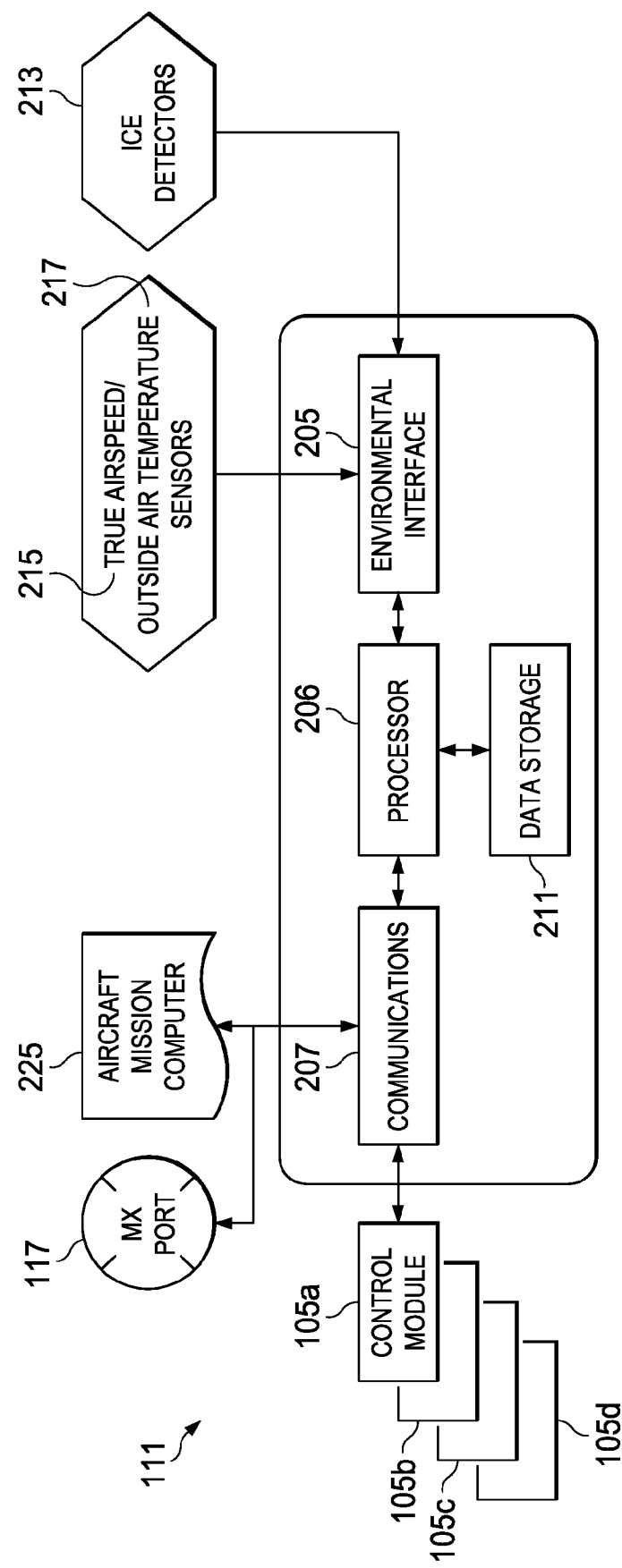
FIG. 4 is a schematic view of a server module from the distributed ice protection system, according to an embodiment of the present application.

Referring now also to FIGS. 2-4, server module 111 is illustrated and described in further detail. Server module 111 can include a processor board 201, a memory storage 203, and a sensor connector 221 for an environmental interface 205, a communications connector 219, and a power connector 223 for power source 209. Memory storage 203 is preferably solid state. Server module 111 is configured as the central interface for distributed ice protection system 101. Environmental interface unit 205 is provided so server module 111 can interface with sensors, such as ice detectors 213, true airspeed (TAS) sensors 215, and outside air temperature (OAT) sensors 217. Server module 111 is configured as the storage point for all system data including environmental conditions, fault logs, data logs, a maintenance suite, configuration files, and software for control modules 105a-105d.

Processor board 201 is configured to incorporate functional units, such as a data storage unit 211, a communications unit 207, an environmental interface unit 205, a processor unit 206, and a power distribution unit 208. Processor unit 206 can act as the central interface point between all the units and contain the main chipset for processing all data and functions of server module 111, as more particularly illustrated in FIG. 4. Data storage unit 211 can contain the buffers and interfaces to the solid state memory 203. Environmental interface unit 205 can contain the conditioning circuits and the analog to digital converter. Communications unit 207 can contain the transmitter, receiver, and buffer circuits for all communications. Power unit 209 can provide voltage regulation and power distribution for the circuitry and solid state memory.

Processor unit 206 can consist of the required chipset to execute all necessary functions for the server capabilities. For example, processor unit 206 can be capable of hosting a program created in the C programming language. Data storage unit 211 can contain sufficient random access memory requisite for memory usage and other memory program storage. Periodically, a record can be taken of memory parameters located in RAM and stored on the solid state memory during in-flight icing encounters to providing trending records and historical data.

Environmental unit 205 can contain signal conditioning and analog to digital conversion circuits to interface with sensor inputs, such as ice detectors inputs, outside air temperature sensor inputs, and true airspeed sensor inputs. Once the data is conditioned and converted, the information can be passed to processor unit 206 for storage and use by system 101. Environmental unit 205 is also configured to read a health discrete from each sensor.

Communication unit 207 is configured as the interface between the aircraft communication bus and system 101. Communication unit 207 is configured to receive data from the mission computer and pass it up to processor unit 206. Communication unit 207 is also configured to act as a bus controller and server interface for all control modules 105a-105d within system 101. Data packets received from a control module, such as one of control modules 105a-105d, can be passed to processor unit 206 for processing and storage. Any information requests from any of control modules 105a-105d can be processed by processor unit 206 and the data returned to communication unit 207 across the bus.

In the dual server configuration, namely a master server 111 and standby server 113, as illustrated in FIG. 1, each server module can contain and process the same data; however, master server 111 is the primary processor/control interface unless a fault occurs in the system. Further, master server 111 and standby server 113 each maintain a health status of itself on its respective server. Master server 111 and standby server 113 monitor the state of the other; if a fault occurs in one of the modules, the other module will assume responsibility for the faulted portion of the unit. Each server module broadcasts a periodic health status message. If one of the server modules fails to broadcast the periodic health status message, the remaining server module will assume full responsibility for the system for the remainder of the power cycle. In an implementation of a plurality of master and standby servers, such as a quad server implementation, the redundant responsibilities can be selectively divided among the plurality of master and standby servers.

The software for each server module 111 is responsible for data transfer between mission computer 225 and control system 101, server functionality for the client control system, current status of aircraft/environment, system parameters, data storage for control modules 105a-105d, maintenance information, environmental input processing, fault reporting/consolidation, maintenance interface processing, system software loading and configuring, data transfer to an independent multi-function display (such as MFD 115), and system theory of operation interface. The software for each server module 111 can contain core functionality generic to any aircraft platform and platform specific software configured to meet the specific unique attributes of the aircraft. Software containing core functions and platform specific functions are kept isolated from each other by utilizing object oriented attributes.

Figure 5:
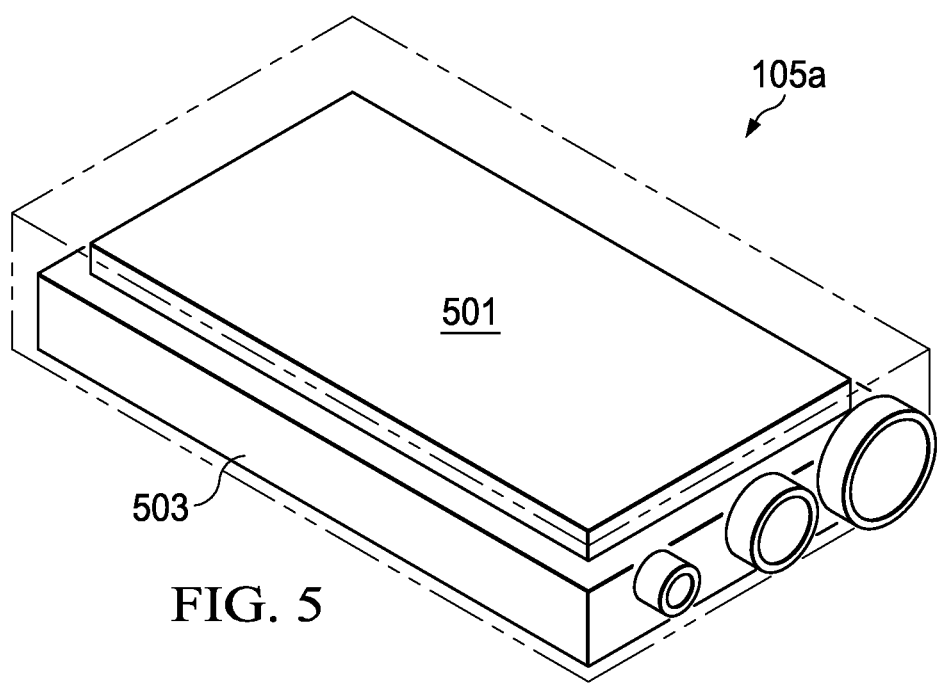
FIG. 5 is a stylized isometric view of a control module from the distributed ice protection system, according to an embodiment of the present application.
Figure 6:
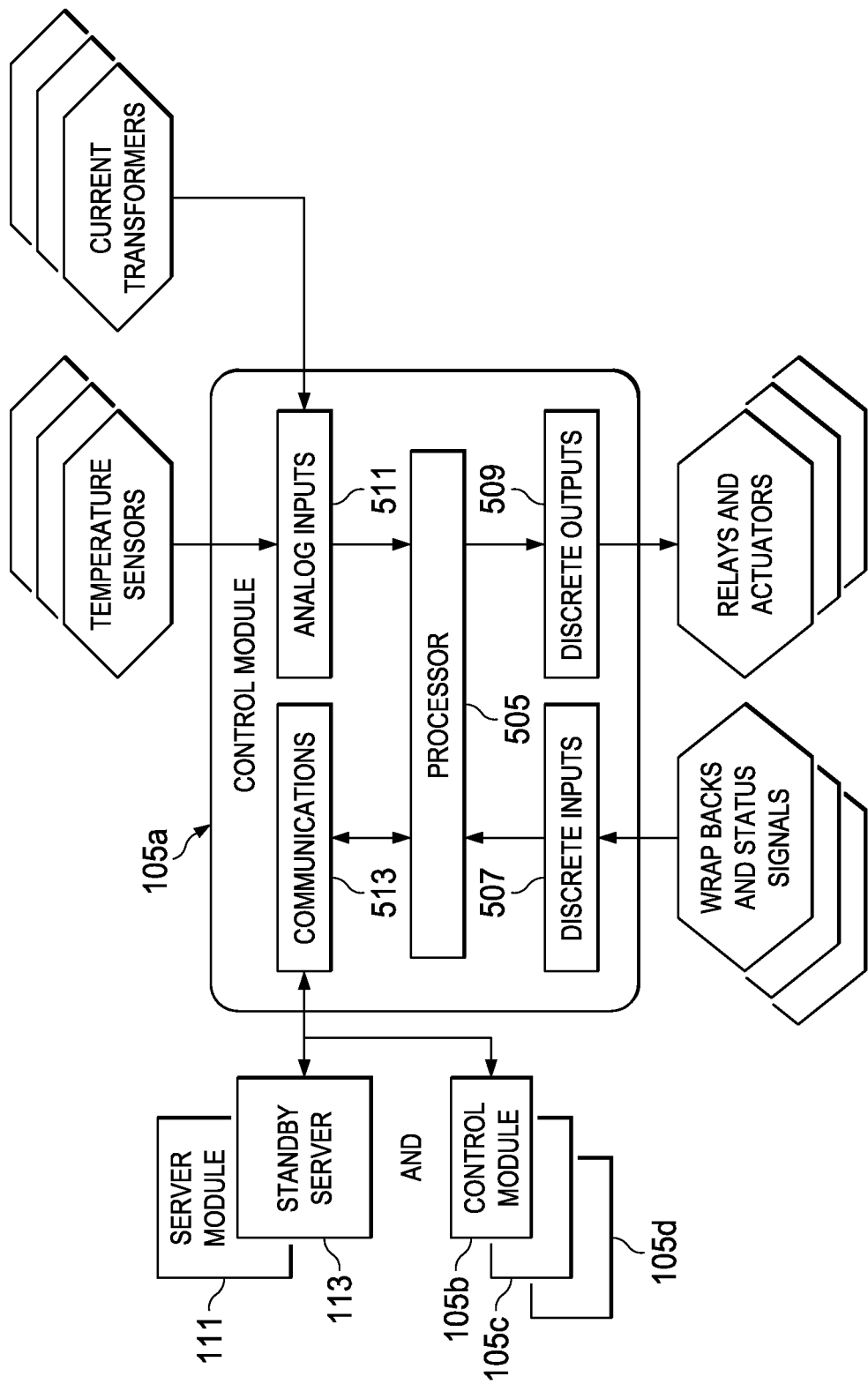
FIG. 6 is a schematic view of a control module from the distributed ice protection system, according to an embodiment of the present application.

Referring now also to FIGS. 5 and 6, each control module 105a-105d (for clarity, only control module 105a is illustrated) is a generic control brick configured to be utilized across the system platform for monitoring and controlling anti-ice and de-ice surfaces. Control module 105a can include a processor board 501 and a conditioning board 503. Control module 105a can be inserted into an implementation specific enclosure for the specific area on the platform with a relay bank designed for that implementation. Control module 105a is configured to monitor line currents for electro-thermal surfaces and resistive-thermal devices for controlling electro-thermal surfaces within a specified temperature band. Control module 105a can utilize a 28VDC output signal to control relays within the enclosure, or in specified cases, an external relay or actuator.

The functional units of control module 105a can include a processor unit 505, a discrete input unit 507, a discrete output unit 509, an analog input unit 511, and a communications unit 513. Processor unit 505 is configured to act as a central interface point between all the functional units and contain the main chipset for processing all data and functions of control module 105a, as illustrated in FIG. 6. Discrete input unit 507 is configured to process data from a discrete status signal, such as a wrap back line or present/not-present indication from an actuator. Analog input unit 511 is configured to contain the condition circuits and analog-to-digital converter for reading temperature sensors and current transformers in system 101. Communications unit 513 is configured to contain any required transmitter, receiver, and buffer circuitry with a 28VDC output to turn on/off relays or actuators in system 101.

In the configuration of system 101 having a primary control module 105a and a standby backup control module 105b, primary control module 105a acts as the default master controller while control module 105b is the backup controller. Each control module 105a and 105b contains and processes the same data; however, master control module 105a is the primary processor/control interface unless a fault occurs in system 101. Each module 105a and 105b maintains a health status of itself on the server module 111. Control modules 105a and 105b each monitor the health state of the other; if a fault occurs in one of control modules 105a and 105b, the other control module will assume responsibility for the faulted portion of the unit. Each control module 105a and 105b broadcasts a periodic health status message. If master control module 105a for a specific control area fails to broadcast the periodic health status message, standby control module 105b will assume full responsibility for the specified control area for the remainder of the power cycle.

Each control module 105a-105d includes hardware and circuitry capable of meeting the functionality described herein for processing, communications, discrete input/output, and analog signal conditioning or conversion.

Processor unit 505 can consist of the required chipset to execute all necessary functions for the server capabilities. For example, processor unit 505 can be capable of hosting a program created in the C programming language. Processor unit 505 can contain sufficient random access memory requisite for memory usage and other memory program storage. Periodically, a record can be taken of memory parameters located in RAM and uploaded to master server 111 and standby server 113 during in-flight icing encounters to providing trending records and historical data. Processor unit 505 is configured with bus controllers that interface with the discrete input unit 507, discrete output unit 509, analog input unit 511, and communications unit 513.

Discrete input unit 507 and discrete output unit 509 are configured to monitor discrete inputs and commanding 28VDC discrete outputs. The outputs of the discrete output unit 509 are configured for driving solid state or mechanical relays, as well as 28 VDC actuators.

Analog input unit 511 is configured with signal conditioning and analog to digital conversion circuits to interface with system analog inputs. Once the data is conditioned and converted, the information is passed to processor unit 505 for storage and use by system 101.

Communications unit 513 is configured as the interface between the servers (such as servers 111 and 113) and control module 105a. Data packets are uploaded to servers 111 and 113 from control module 105b for processing and storage. Control module 105a downloads data for use within the control module 105a from server 111 and/or server 113, as needed. Servers 111 and 113 are capable of pushing data to the control modules as needed to ensure system health.

The software of each control module 105a-105d is preferably mostly common across platforms with the primary platform specific software being related to control, monitoring, and fault isolation requirements for the platform. The software of each control module 105a-105d is responsible for upload/download data requirements to and from server modules 111 and 113, monitor/control functions for specified area, and fault isolation/reporting. The software for each control module 105a-105d contains core functionality generic to any aircraft platform and platform specific software configured to meet the specific unique attributes of the aircraft. The software can be configured so that core functions and platform specific functions are kept isolated from each other by utilizing object oriented attributes.

The software of each control module 105a-105d is configured to provide periodic health check for control module components, interrupt priority and control, and data gathering and storage from the module inputs. The periodic health check can encompass the status of the analog to digital health, discrete wrap backs, communication status with other server modules and control modules, communication status with the mission computer, status of the power regulation, and watchdog timer status. The software is configured to prevent a fault based on a software error such that the entire module is halted; further, the software is configured with warm start capabilities. The control module 105a can be considered to have failed after a threshold of warm starts have occurred, such as three warm starts, for example. If the threshold of warms starts is surpassed, then the standby control module 105b assumes responsibility.

The software of each control module 105a-105d is configured such that each control module 105a-105d pushes data uploads to the server modules 111 and 113 containing fault records or system status periodically. Additionally, each control module 105a-105d is configured to receive system broadcasts or pushed data from server modules 111 and 113. These updates can include environmental status data and system health status.

The software of each control module 105a-105d is configured to monitor and control functionality of specified control surfaces via discrete input unit 507 and discrete output unit 509, respectively. The discrete outputs are used to control the systems relays and actuators for anti-ice or de-ice operation. The discrete inputs provide system health status or configuration of various platform specific components.

Control module 105a operates in tandem with standby control module 105b to create a redundant system. Both control modules 105a and 105b contain exact copies of the data. If control module 105a fails, standby control unit 105b assumes primary responsibility for that functionality in system 101. If control module 105a fails completely, standby control module 105b assumes the role as the primary controller.

Figure 7:
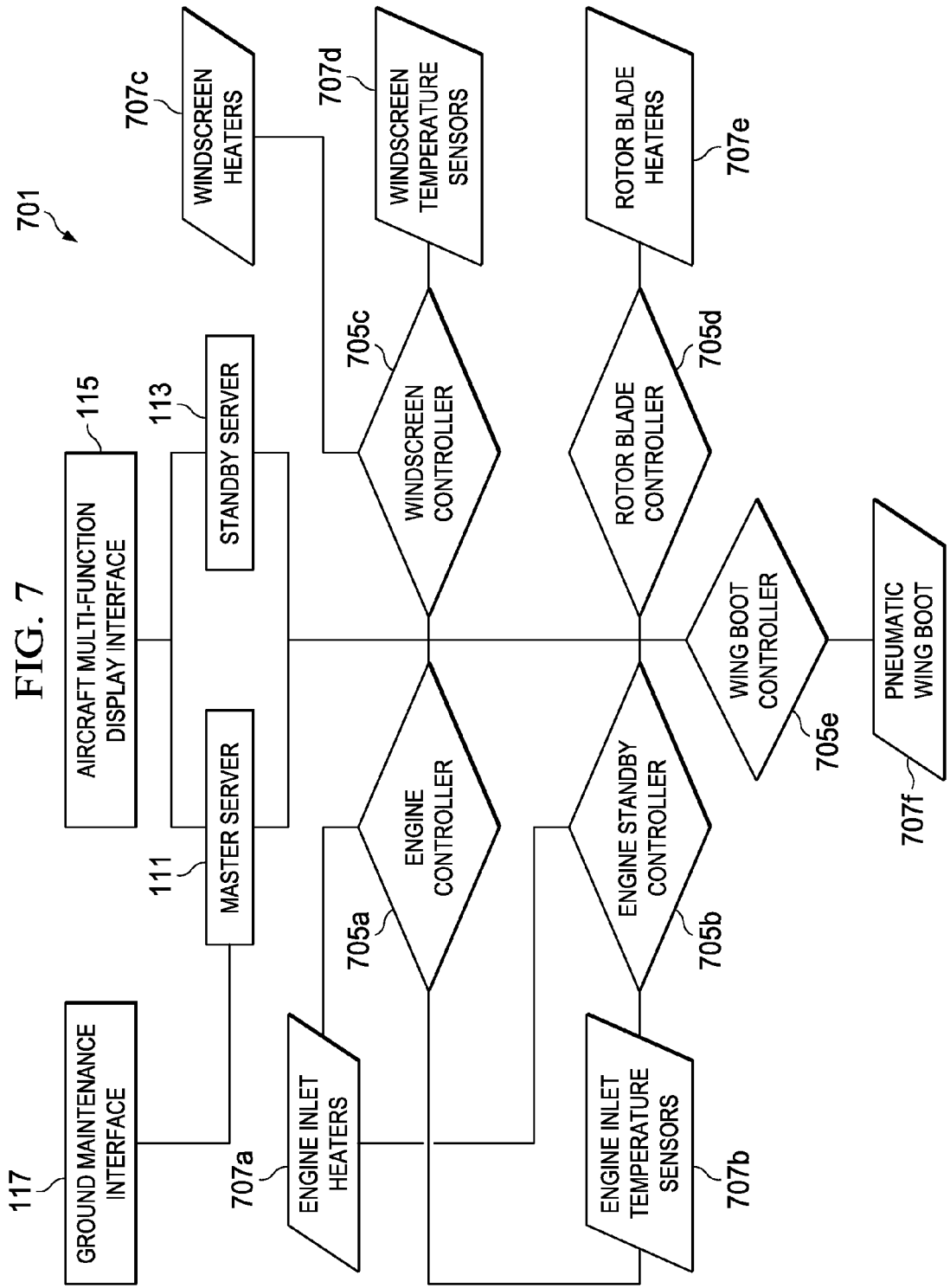
FIG. 7 is a schematic block diagram of an implementation of a distributed ice protection system, according to an embodiment of the present application.

Referring to FIG. 7, system 701 is illustrated, which is an example implementation of system 101, previously described at least in FIG. 1. System 701 includes control modules 705a-705e, which are aircraft implementations of control modules 105a-105d, shown in FIG. 1. System 701 further includes the following components: an engine inlet heater 707a, an engine inlet temp sensor 707b, windscreen heater 707c, windscreen temperature sensor 707d, rotor blade heater 707e, and pneumatic wing boot 707f, which are aircraft implementations of components 107a-107d and 109a/109b, shown in FIG. 1.

Figure 8:
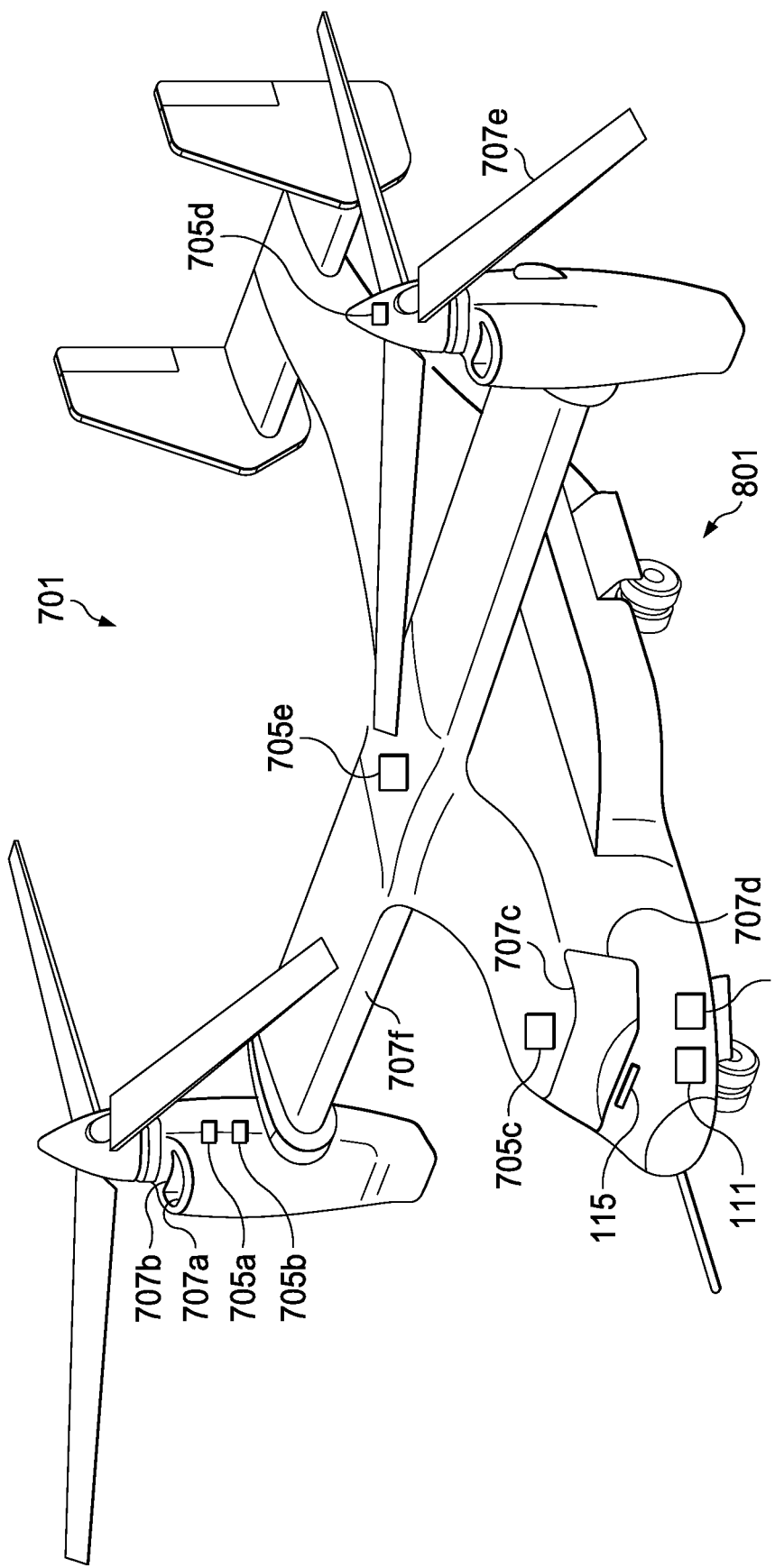
FIG. 8 is a stylized perspective view of an aircraft having a distributed ice protection system, according to an embodiment of the present application.

Referring now also to FIG. 8, system 701 is illustrated on an aircraft 801. In the illustrated embodiment, aircraft 801 is a tilt rotor aircraft; however, it should be appreciated that system 701 is equally adaptable to other aircraft, such as conventional rotorcraft and fixed wing aircraft, for example.

The distributed ice protection system of the present application removes the possibility of single point and inherited failures by distributing independent control modules across the platform such that loss of one module does not mean the loss of large portions of the system. Further, the system provides for improved maintenance through a common control system to be used across multiple platforms, an "on-board" maintenance interface, reduction in required support equipment, and a reduction in required maintenance time. Further, the system reduces the size of modules to allow placement near to the controlled component and improve environmental robustness. Further, the system is configured to provide a common, multi-platform, integrated system that can be tailored to the needs of the aircraft operator's requirements. Further, a faulty control module in an enclosure can be replaced with a control module from another aircraft's control module enclosure, thereby decreasing the procurement requirements of the control modules. In other words, the generic control modules can be utilized across different aircraft enclosures, thereby reducing procurement requirements.

The distributed ice protection system, according to the present application provides significant advantages, including: 1) utilizable on different platforms; 2) having full redundancy or targeted redundancy in order to meet required mission capability/survivability rates; 3) having improved mission capability and survivability rates to meet required mission capability and survivability rates; 4) having improved maintenance capabilities with minimal maintenance time; and 5) having capability for a common control system across multiple platforms of an organization fleet.

Embodiments of distributed ice protection system 101 can include one or more computer systems having hardware and software for performing one or more tasks described herein. This can include, for example, a computer having one or more processing units and non-volatile memories that store non-transitory software instructions for instructing the processing units to perform at least some of the tasks described herein. Further, the software described herein is non-transitory.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. An ice protection control system for an aircraft, the system comprising:
   a plurality of ice protection elements configured for removing ice and/or preventing the formation of ice on a surface;
   a generic control core comprising:
   a master server;
   a control module; and
   a standby server configured to act as redundant server for the master server;
   wherein the master server is configured to receive a sensor data and send the sensor data to the control module;
   wherein the control module is configured to be programmable with functional software from the master server, the control module being configured to functionally operate the plurality of ice protection elements after being programmed with the functional software from the master server;
   wherein the standby server and the master server are each configured to maintain a health status of itself on the other.

2. The ice protection system according to claim 1, the generic control core further comprising:
   a standby control module configured to act as a redundant controller for the control module.

3. The ice protection system according to claim 2, wherein the control module and the standby control module are each configured to maintain a health status of itself on the master server.

4. The ice protection control system according to claim 1, wherein the master server is a central interface for the generic control core, such that a software update to the functional software residing on the control module can be made via a ground maintenance interface to the master server.

5. The ice protection control system according to claim 4, wherein the communications interface is a computer.

6. The ice protection control system according to claim 1, wherein the master server stores operational data pushed from the control module, the operational data pertaining to the historical operation of the ice protection elements.

7. The ice protection control system according to claim 1, wherein the sensor data includes at least one of:
an outside air temperature; and
a true air speed of the aircraft.

8. The ice protection system according to claim 1, the generic control core further comprising:
a standby control module configured to assume full functional responsibility of the ice protection elements if the control module fails to broadcast a periodic health status message to the master server.

9. The ice protection system according to claim 1, wherein the control module is generic so as to be installable on a different aircraft platform, the control module is adaptable to a specific aircraft platform by being programmed with operational software.

10. The ice protection system according to claim 1, wherein the control module is responsible for reporting a fault of any ice protection elements under control of the control module to the master server.

11. The ice protection system according to claim 1, wherein the master server is in communication with a multifunctional display such that an occupant of the aircraft can interface with the ice protection system.

12. A method of operating an ice protection control system, the method comprising:
providing a control module in data communication with an ice protection component, the ice protection component being at least one of an anti-ice component and a de-ice component;
providing a server module in data communication with the control module;
providing a standby server configured to act as a redundant server for the server module;
maintaining a health status of the server module on the standby server; and
programming the control module with functional software instructions by loading the software on the control module from the server module.

13. The method according to claim 12, further comprising:
dictating the functionality of the ice protection component with the control module.

14. The method according to claim 12, further comprising:
uploading operational data from the control module to the server module for storage on the server module.

15. The method according to claim 12, further comprising:
re-programming the functional software on the control module by updating software on the server module via a ground maintenance interface.

16. The method according to claim 12, further comprising:
communicating sensor data to the control module from the server module, the sensor data being evaluated by the control module during functional operation of the ice protection component by the control module.

17. An aircraft comprising:
a fuselage;
a plurality of ice protection elements configured for removing ice and/or preventing the formation of ice on a surface;
a generic control core comprising:
a master server;
a control module; and
a standby control module configured to act as a redundant controller for the control module;
wherein the master server is configured to receive a sensor data and send the sensor data to the control module;
wherein the control module is configured to be programmable with functional software from the master server, the control module being configured to functionally operate the plurality of ice protection elements after being programmed with the functional software from the master server;
wherein the control module and the standby control module are each configured to maintain a health status of itself on the master server.

18. The aircraft according to claim 17, wherein the control module is generic so as to be installable to any portion of the aircraft, the control module being adaptable to the specific portion of the aircraft by being programmable with operational software relevant to control the ice protection elements in that portion of the aircraft.

* * * * *